United States Patent [19]
Dussell

[11] Patent Number: 5,633,799
[45] Date of Patent: May 27, 1997

[54] COMBINED PC/104 AND SATELLITE POSITIONING SYSTEM

[75] Inventor: William O. Dussell, Pescadero, Calif.

[73] Assignee: Trimble Navigation Limited, Sunnyvale, Calif.

[21] Appl. No.: 289,916

[22] Filed: Aug. 12, 1994

Related U.S. Application Data

[63] Continuation-in-part of Ser. No. 69,142, May 28, 1993, abandoned.

[51] Int. Cl.$^6$ ........................................... G01S 5/00
[52] U.S. Cl. ..................... 364/449.9; 364/460; 342/357
[58] Field of Search ........................... 364/443, 449, 364/460; 342/450, 451, 352, 357, 358; 340/988, 990, 991, 995; 73/178 R

[56] References Cited

U.S. PATENT DOCUMENTS

| | | | |
|---|---|---|---|
| 5,019,828 | 5/1991 | Schoolman | 342/457 |
| 5,075,693 | 12/1991 | McMillan et al. | 342/457 |
| 5,119,504 | 6/1992 | Durboraw, III | 455/54.1 |
| 5,134,407 | 7/1992 | Lorenz et al. | 342/352 |
| 5,185,610 | 2/1993 | Ward et al. | 342/357 |
| 5,194,871 | 3/1993 | Counselman, III | 342/357 |
| 5,214,757 | 5/1993 | Mauney et al. | 395/161 |
| 5,268,844 | 12/1993 | Carver et al. | 364/443 |
| 5,270,936 | 12/1993 | Fukushima et al. | 364/444 |
| 5,289,195 | 2/1994 | Inoue | 342/457 |
| 5,345,244 | 9/1994 | Gildea et al. | 342/357 |

OTHER PUBLICATIONS

IEEE PC Bus Standard P996, Draft D2.02, 13 Jul. 1990. (No Page Numbers).
IEEE Standard for Compact Embedded–PC Modules P996.1 Draft D1.00, pp. 1–16, 20 Oct. 1993.

*Primary Examiner*—Vincent N. Trans
*Assistant Examiner*—Leigh Marie Garbowski
*Attorney, Agent, or Firm*—John Schipper

[57] ABSTRACT

Apparatus for determining the present location of, or time of observation by, an observer in the vicinity of the Earth's surface. The apparatus provides a Satellite Positioning System (SATPS), such as GPS or GLONASS, in a portable device or card that is built to the I.E.E.E. PC/104 Standard, which is a variation of the I.E.E.E. P996 Standard for personal computer buses. The PC/104/SATPS Card includes an SATPS antenna to receive (and frequency downconvert, if necessary) SATPS signals from one or more SATPS satellites, a microprocessor programmed to receive the SATPS signals from the antenna and to perform calculations to determine the spatial location of the antenna and/or the time of observation by the antenna. The PC/104/SATPS Card has a buffer and a format translator to compensate for SATPS signal latency and for differences in SATPS signal arrival rate and PC/104 signal processing rate and/or to translate signals from SATPS format to whatever format the microprocessor uses. The PC/104/SATPS Card optionally has a keyboard, pen-and-tablet or other information entry means, optionally includes an information transfer module for transferring information from the PC/104/SATPS Card to another electronic apparatus for further signal processing or for display of the location of, or time of observation by, the antenna, and optionally includes a display module for displaying the location of, or time of observation by, the antenna in a visually perceptible manner on the card itself.

4 Claims, 1 Drawing Sheet

COMBINED PC/104 AND SATELLITE POSITIONING SYSTEM

This application is a continuation in part of an earlier application, U.S. Ser. No. 08/069,142, filed 28 May 1993, abandoned 6 Feb. 1995.

FIELD OF THE INVENTION

This invention relates to receipt and analysis of Satellite Positioning System signals on small size computer cards to provide navigation, location and time information.

BACKGROUND OF THE INVENTION

In the past 14 years, the personal computer (PC) architecture has become an accepted standard for applications for personal computing, control microprocessors, point-of-sale registers, vending machines, laboratory instruments, and medical and other laboratory data-gathering instruments. Many other interesting applications are available, if the PC bus and CPU can be made sufficiently compact and the power requirements can be reduced.

Applications of small size microprocessors and related products have appeared from time to time in other technical areas. A special purpose peripheral circuit or add-on card for connection to a computer is disclosed by Brockman in U.S. Pat. No. 4,702,189. The card provides time and date information and continuously updates the normal computer clock whenever the computer is rebooted. The card connects to the computer in parallel with, but does not interfere with normal operation of, a printer or other input/output device.

U.S. Pat. No. 4,748,320, issued to Yorimoto et al, discloses an integrated circuit card including a central processing unit (CPU), program memory, random access memory, a data bus and an address bus. An input/output device, such as a keyboard, is connected to the card entry and readout of information and instructions. The card provides expansion of existing files.

Miyano, in U.S. Pat. No. 4,847,803, discloses an "IC card", containing an integrated circuit, that has a control unit for data processing, a data memory and a software program memory. The IC card memory stores several personal identification numbers (PINs) and contains a program that compares an externally entered PIN index and the internally stored PINs, to determine whether the data or instructions sought to be entered by the cardholder can be accepted and executed. Data and instruction entry occurs by a conventional card reader.

A "smart" IC card, having a CPU, data memory, a "keyboard" and onboard visual display is disclosed by Tanaka in U.S. Pat. No. 4,924,075. The CPU operates in three modes, namely time display, numerical or calculational, and accounting or transactional. The keyboard includes a numerical keypad and the five numerical operations (+, −, *, /and =) and several pre-programmed transaction keys.

A universal connector device for communication of instructions and data between a CPU of a host computer CPU, a CPU bus of an external co-processor, and a host computer expansion card is disclosed by Rubin in U.S. Pat. No. 4,954,949. Compatibility between the host computer and co-processor is provided by a bridge card that connects the buses of the two processors to each other and to a memory device for use by the co-processor.

U.S. Pat. No. 4,965,802, issued to Shinigawa, discloses an IC card with data memory segmented into externally entered information and information generated internally from the externally entered information, including a history of transactions using the card. The card contains a data processing unit, an input/output unit, and what appears to be a read only memory (ROM) for on-board storage of fixed data processing programs. An error detection unit is optionally included on the card.

Dethloff et al disclose a smart IC card for storing and using the present currency exchange rates, in U.S. Pat. No. 4,968,873. Exchange rates for several currencies are stored and updated as required. A maximum transaction limit for the cardholder is included, which limit can be translated into the currency presently being used to determine if the transaction is permissible. The card carries a keyboard for data entry, data memory for the currency exchange rates, and a CPU to translate the currency value and compare the transaction value with the transaction limit.

An integrated circuit with an access-controlled data memory contained on an IC card, for protecting secret code data, is disclosed by Schrenk in U.S. Pat. No. 5,014,311. Access to certain parts of memory is limited to one or more predetermined time periods.

Wilhelm, in U.S. Pat. No. 5,020,926, discloses a printer assembly with a form factor that is as small as a disk drive assembly for a microcomputer. The printer assembly slides between a first position, inside the microcomputer, and a second position, generally outside the microcomputer, for use in printing data provided by the microcomputer. The printer assembly carries its own power supply and has a standard bus arrangement for receipt of instructions and data from the microcomputer.

U.S. Pat. No. 5,038,025, issued to Kodera, discloses a method of downloading a software program to an IC card. The IC card contains program memory, data memory, a CPU, and an input/output interface that transfers program information to the card from an external keyboard or work station. The card keeps track of available memory on board and informs the keyboard user if insufficient memory remains to accept and store a program or data. The program instructions entered from the keyboard can be stored in specified memory locations or in memory locations chosen by the CPU. Absolute addressing and/or relative addressing is available for program instruction storage.

A computer bus interconnection plug-in device to provide PC compatibility with a VME computer is disclosed in U.S. Pat. No. 5,083,259, issued to Maresh et al. A circuit board containing a PC/AT bus and a PC/AT CPU and associated random access memory. Provision of input/output devices, such as a keyboard and a video display, for the PC/AT CPU is also mentioned.

Buxton et al, in U.S. Pat. No. 5,123,092, disclose an external expansion bus interface for a microcomputer that can select and de-select any devices connected to the expansion device. Device selection and de-selection are implemented by selectively enabling and disabling buffers that intercept signals passing between the external bus and the microcomputer bus.

None of these inventions provides for straightforward entry of data into the microprocessor, for example, through an antenna, or use of a very small computer card, such as a PC/104 card, with satellite or other radiowave signals to provide navigation, location and tracking information for the carder of a card configured to the PC/104 standard. These inventions also do not provide for reconciliation of data entered in a format that is initially incompatible with the format adopted for the PC/104 card. What is needed is an enhanced or improved small computer card that provides these features.

SUMMARY OF THE INVENTION

These needs are met by the invention, which provides a PC/104/SATPS Card, built compatible with the PC/104 standards and specifications discussed below, that receives and processes Satellite Positioning System (SATPS) signals from one or more SATPS satellites. In one embodiment, the PC/104/SATPS Card includes an SATPS antenna positioned to receive SATPS signals from one or more SATPS satellites, with each signal being characteristic of a particular satellite, and to issue these signals as antenna output signals. The PC/104/SATPS Card also includes a radiofrequency downconverter to receive the antenna output signals, to convert the primary frequency of each of these signals to a selected lower frequency, and to issue these down-converted signals as downconverter output signals. The PC/104/SATPS Card further includes a programmed digital signal processor and associated memory that receives the downconverter output signals corresponding to each SATPS signal received by the antenna, determines the present location of, or time of observation by, the antenna, and issues these signals as processor output signals. Finally, the PC/104/SATPS Card includes an information transfer module that receives the digital signal processor output signals and transmits these output signals to an electronic device that is linked to the PC/104/SATPS Card, for further signal processing or for display of the location of and/or time of observation by the antenna.

In a second embodiment, the PC/104/SATPS Card includes an image display module in place of the information transfer module of the first embodiment. The image display module receives the digital signal processor output signals and displays the present location of, and/or time of observation by, the antenna in a visually perceptible manner.

PC/104 is a new CPU form factor standard, discussed in some detail below, that can be used to provide various I/O and signal processing services. The invention provides an SATPS signal antenna and receiver/processor card that adheres to the PC/104 standard. The card may include other features, such as (1) a memory buffer and (2) firmware that senses the UTC time and resets the CPU clock to UTC time or to some other acceptable standard. Use of a buffer is advisable here because the SATPS antenna output signals are serial, and the host computer may have difficulty digesting serial data that arrives at a 1–10 MHz rate. Provision of SATPS signals in serial form may require a latency period, which many host computers do not deal with well. The memory buffer can examine the incoming signals and accept only the data segments of interest for provision of an SATPS location fix; these data segments could be brought directly from the buffer when these segments are needed.

DESCRIPTION OF THE BEST MODE OF THE INVENTION

Figure 1:
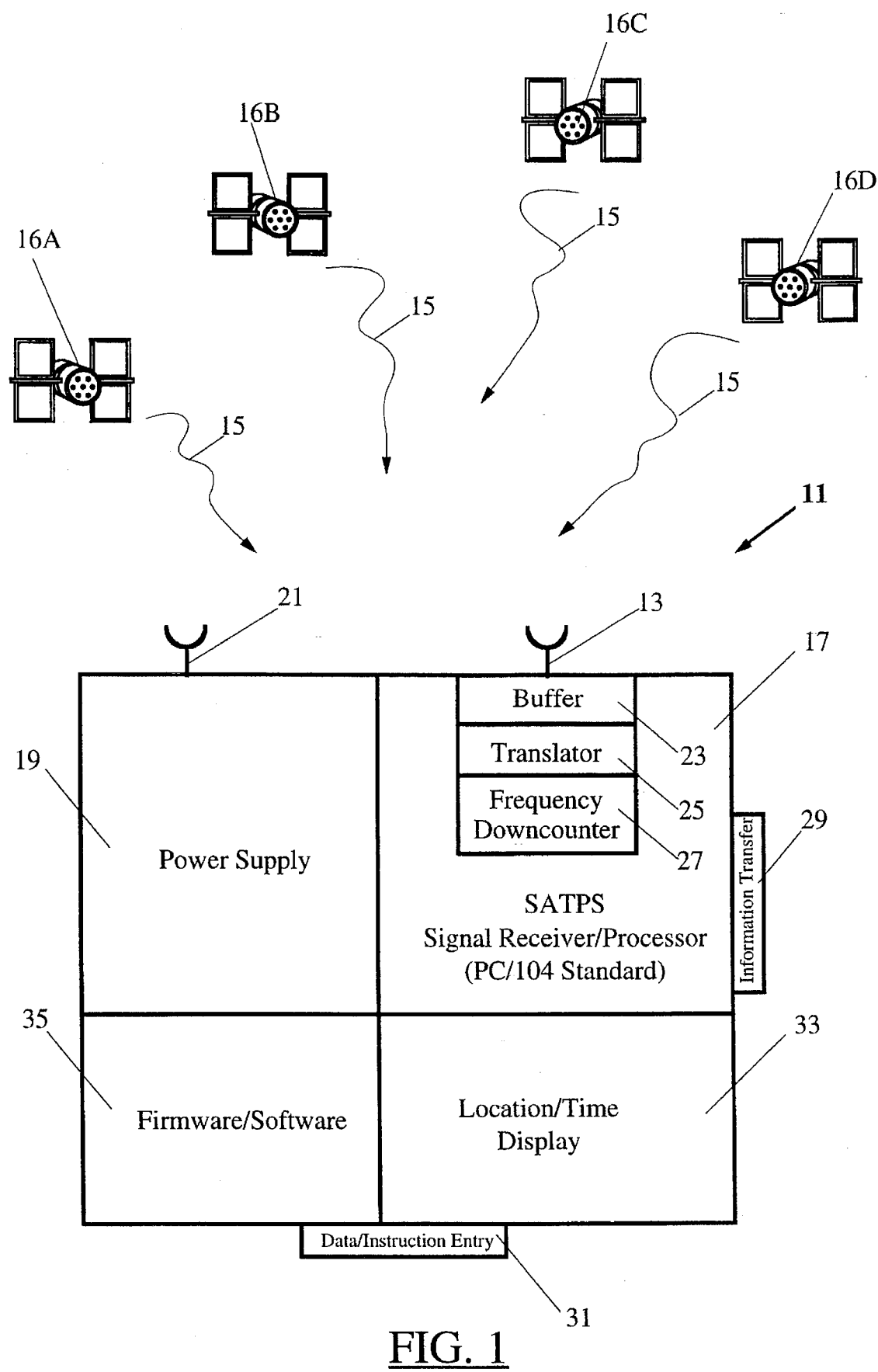
FIG. 1 is a schematic view (not drawn to scale) of an embodiment of the invention.

FIG. 1 illustrates one embodiment of the invention, a PC/104/SATPS Card 11 that includes: an SATPS antenna 13 that receives Satellite Positioning System (SATPS) signals 15 from one or more SATPS satellites 16A, 16B, 16C, etc., an SATPS receiver/processor or microprocessor or CPU 17 that receives the SATPS signals from the SATPS antenna and is programmed to perform calculations using these signals to determine the antenna location and/or time of observation; a power supply 19 and electrical power connector 21 that provide power for the SATPS antenna 13 and receiver/processor 17.

Optionally, the antenna 13 and/or receiver/processor 17 includes one or more of the following: a signal buffer 23 that receives and temporarily stores SATPS signals until the receiver/processor 17 is ready to process these signals; a signal reformatter or translator 25 that receives SATPS signals and reformats these signals or translates the signals into a format and form that the receiver/processor 17 can accept and process; and/or a frequency downconverter 27 that receives the SATPS signals and converts these signals to a selected lower frequency.

As used herein, the phrase "PC/104/SATPS Card" refers to any embedded-PC module that complies with the PC/104 Specification, version 1.0 or later, discussed below, and that provides navigation and location information through receipt and analysis of SATPS signals from a plurality of SATPS satellites.

The PC/104 is a standard developed by the PC/104 Consortium for such purpose by an extension of the I.E.E.E. P996 specification, originally developed as an extension of the PC, PC/XT and PC/AT buses. The number of bus connector pins used in the PC/104 architecture is 64 pins for P1 and 40 pins for P2, for a total of 104 pins, from which the Standard takes its name. The PC/104 Standard is now accepted and used in some applications, rather than being merely a theoretical standard developed by a group of workers over an extended period of time. The PC/104 Standard was developed from the earlier P996 Standard, which is summarized first.

The I.E.E.E. P996 Standard is a personal computer bus standard developed by the P996 Working Group of the Microprocessor Standards Subcommittee of the I.E.E.E. Computer Society and is set forth in Draft D2.02 of the Personal Computer Bus Standard P996, published on 13 Jul. 1990 by the I.E.E.E. Standards Depertment, 445 Hoes Lane, P.O.Box 1331, Piscataway, N.J. 08855-1331. This statement of the Standard is believed to be known and used by workers of ordinary skill in computer cards. The P996 Standard specifies 8-bit and 16-bit personal computer backplane buses, based on the buses originally developed by I.B.M. for the PC/XT and PC/AT computers. The P996 Standard uses 88 active signals and 10 power and ground pins contained in first and second PCB edge connectors having 62 pins and 36 pins, respectively. The form factors specified for the 8-bit adapter, using one connector, and the 16-bit adapter, using two connectors, are 3.9×13 inches and 4.5×13 inches, respectively. The 8-bit and 16-bit adapters are physically compatible with the PC/XT and PC/AT computers. The low voltage and high voltage signal levels are 0.8 volts and 2.0 volts, respectively, with reference to a ground voltage that is also provided in a P996 structure.

The P996 Standard provides at least two kinds of electrical signal buses, for addresses and for data. The data bus is the primary vehicle for information exchange within a P996 structure. A bus transfer of data can be driven by either a so-called Initiator or by a so-called Target. A system clock signal in a P996 structure may have a rate between 6 and 8.33 MHz. The basic OSC clock signal is about 14.31818 MHz and is driven by a Permanent Master source. Utilities available in a P996 structure include control signals, command signals and transfer response signals. The P996 structure provides bus arbitration, including dynamic memory access (DMA) and arbitration control, and provides non-shared and (optionally) shared interrupt requests. Data transfer operations, including read/write memory access and input/output operations, are defined.

The Permanent Master source has sole responsibility for output of data requiring multiplexing services to a system and for generation of signal refresh lines. However, the Permanent Master source shares responsibility and control for many other tasks with a Current Master source (an Alternate Master source, Permanent Master source or Temporary Master source that presently has control of a bus). Use of a refresh line is optional to a bus adapter; initiation of refresh cycles requires use of a Temporary Master other than the Permanent Master, if the Master retains control of the bus for more than a threshold time interval of 15μsec. A particular sequence of steps must be followed to generate a refresh cycle.

A non-shared interrupt request allows only one adapter to use an interrupt request line at a given time. An adapter that receives an interrupt request drives a line to a Low state, then drives the line to a High state to generate the interrupt command, where the line remains until the interrupt request is acknowledged. Use of a non-shared interrupt, which is optional with the P996 and PC/104 structures, allows more than one adapter to use a common interrupt request line.

Presence of a bus error is indicated with a special signal, IOCHCHK*, that is asserted to require sampling for error monitoring purposes. A bus error signal is cleared by the next memory reference signal, using that bus, that does not include the bus error signal.

The P996 Standard specifies voltage levels for an add-in board to be used with the P996 bus. These levels include ground (0 volts) plus the levels +12, +5, −5 and −12 Volts, on each of which voltage noise of up to 1 percent of the non-zero nominal voltage value is permitted. A voltage level deviation of up to ±5 percent is allowed for the non-zero nominal voltage levels actually used in a P996 structure. The maximum currents for a circuit component operating at +12, +5, 0, −5 and −12 Volts are 1, 4.5, 5.5, 0.2 and 0.3 Amps, respectively. Maximum power dissipation of a P996 structure operating at the maximum voltage and current limits is estimated at about 46 Watts.

Minimum rise and fall times for driver signals measured at an adapter is 3 nanoseconds. Use of a shorter rise or fall time may increase the time delay to achieve a stable output signal.

The long dimension of a printed circuit board containing a P996 structure includes 0.905 inches at one end for the edge connector fingers, for the 8-bit and 16-bit form factors.

The pin assignments for the 98 pins on a P996 structure are specified, but these would be superseded by the pin assignments for the 104 pins on a PC/104 structure.

Timing diagrams, voltage levels, active (High or Low) levels for particular signals and many other details are set forth in the I.E.E.E. Draft D2.02 document, op cit.

The I.E.E.E. PC/104 Standard differs from the earlier I.E.E.E. P996 Standard in several ways: (1) the PC/104 form factor is much smaller, measuring approximately 9 cm by 9.5 cm by 1.5 cm, which allows use of a PC/104 module or structure in limited space environments; (2) the PC/104 standard calls for use of a unique self-stacking bus that eliminates most of the need for, and thus the cost of, backplanes; (3) the PC/104 standard uses 64-pin and 40-pin male/female connectors rather than the 98 card-edge connectors used on the P996 Standard; (4) power consumption is typically lowered to 1–2 Watts per module, through use of a bus drive of only 6 millivolts (mV); and (5) component count is reduced. Two adjacent PC/104 modules may be spaced apart by a distance of 1.5 cm in an installed stack of such modules, using self-stacking buses developed for use with PC/104 modules. These and other differences are summarized in a publication by the PC/104 Committee, "PC/104: A Compact Embedded-PC Standard", Specification 1.0, March 1992, and in Draft P996.1/D1.00, Standard for Compact Embedded-PC Modules, 20 Oct. 1993, published by the I.E.E.E. Computer Society and available from the I.E.E.E. Standards Office, 455 Hoes Lane, Piscataway, N.J. 08854-1331.

Table 1 sets forth the 104 pin assignments in the PC/104 standard.

TABLE 1

PC/104 Bus Signal Pin Assignments

| Pin Number | J1/P1 Row A | J1/P1 Row B | J2/P2 Row C | J2/P2 Row D |
|---|---|---|---|---|
| 0 | — | — | 0 V | 0 V |
| 1 | IOCHCHK* | 0 V | SBHE* | MEMCS16* |
| 2 | SD7 | RESETDRV | LA23 | IOCS16* |
| 3 | SD6 | +5 V | LA22 | IRQ10 |
| 4 | SD5 | IRQ9 | LA21 | IRQ11 |
| 5 | SD4 | −5 V | LA20 | IRQ12 |
| 6 | SD3 | DRQ2 | LA19 | IRQ15 |
| 7 | SD2 | −12 V | LA18 | IRQ14 |
| 8 | SD1 | ENDXFR* | LA17 | DACK0* |
| 9 | SD0 | +12 V | MEMR* | DRQ0 |
| 10 | IOCHRDY | (KEY) | MEMW* | DACK0* |
| 11 | AEN | SMEMW* | SD8 | DRQ5* |
| 12 | SA19 | SMEMR* | SD9 | DACK8* |
| 13 | SA18 | IOW* | SD10 | DRQ6 |
| 14 | SA17 | IOR* | SD11 | DACK7* |
| 15 | SA16 | DACK3* | SD12 | DRQ7* |
| 16 | SA15 | DRQ3 | SD13 | +5 V |
| 17 | SA14 | DACK1* | SD14 | MASTER* |
| 18 | SA13 | DRQ1 | SD15 | 0 V |
| 19 | SA12 | REFRESH* | (KEY) | 0 V |
| 20 | SA11 | SYSCLK | — | — |
| 21 | SA10 | IRQ7 | — | — |
| 22 | SA9 | IRQ6 | — | — |
| 23 | SA8 | IRQ5 | — | — |
| 24 | SA7 | IRQ4 | — | — |
| 25 | SA6 | IRQ3 | — | — |
| 26 | SA5 | DACK2* | — | — |
| 27 | SA4 | TC | — | — |
| 28 | SA3 | BALE | — | — |
| 29 | SA2 | +5 V | — | — |
| 30 | SA1 | OSC | — | — |
| 31 | SA0 | 0 V | — | — |
| 32 | 0 V | 0 V | — | — |

In Table 1, rows C and D are not used on 8-bit modules. The P2 connection has two connector options with differing physical pinout orientation. The B10 and C19 pins are special purpose key locations. Signal timing and function are as specified in the P996 Standard, although signal source/sink current may differ from the P996 values.

The PC/104 module can have an 8-bit bus or a 16-bit bus, corresponding to the PC/XT and PC/AT buses, respectively. Each of these buses offers two options, according to whether the P1 and P2 bus connectors extend through the module as "stackthrough" connectors, or do not extend through the module. These options provide additional flexibility and allow design choices that facilitate minimum space planning for the PC/104 module. A typical stack of modules could accommodate a mix of stack-through and non-stack-through configurations or a configuration that is purely stack-through or purely non-stack-through.

Four options are available here: (1) 8-bit, stackthrough P1 option, which uses a self-stacking 8-bit PC bus that can be placed anywhere in a multi-module stack; (2) 8-bit, non-stackthrough P1 option, which offers minimum module thickness by omitting the P1 bus stackthrough pins; this version cannot co-exist with a 16-bit, stackthrough P2 option; (3) 16-bit, stackthrough P2 option, where both the P1 and P2 bus connectors are stackthrough to eliminate the need for a P2 daisy-chain cable; this version cannot co-exist with an 8-bit, non-stackthrough P1 option or with a 16-bit, non-stackthrough option module; and (4) 16-bit, non-stackthrough P2 option, which uses a stackthrough P1 bus connector and a P2 bus connector oriented perpendicular to the P1 bus connector; this version can be placed anywhere in a multi-module stack and can co-exist with 8-bit stack-through version modules; a short ribbon cable is normally used to form daisy-chain of P2 bus connectors here.

All PC/104 bus signals are identical in definition, in function and in signal timing to the P996 bus signals, and signals are assigned in the same order on the connectors for the P996 and PC/104 modules. High and Low logic levels for the PC/104 module are identical to the respective High and Low logic levels for the P996 module.

Some ground pins have been added to the PC/104 module to improve bus integrity. To reduce component count and minimize power consumption and heat dissipation, most bus signals have a reduced bus current drive requirement, about 6 milliamps (mA) of sink current. However, four signals, MEMCS16, IOCS16, MASTER and ENDXFR, are open collector signals that must drive 330-Ohm voltage pull-up resistors (part of a P996 configuration); and these four signals require drive currents of 20 mA.

Bus termination, if it is included, must be AC termination. One suitable choice for termination is a network of 40–60 Ohms resistors connected in series with 30–70 picofarads (pF) capacitors and connected between each bus signal and ground. Table 1 above for the PC/104 Specification, version 1.0, sets forth the bus signal assignments for the pin connections. Bus termination for control signals is recommended, to enhance data reliability and system integrity.

All bus devices that share a common interrupt signal must be equipped with a suitable interrupt-sharing circuit, with the following restrictions: (1) the shared interrupt line must not have a voltage pull-up resistance (up to +5 volts) smaller than 10 kilo-ohms anywhere in the system; and (2) the shared interrupt line must have precisely one pull-down resistor (with a value of about 1 kilo-ohm) connected between the interrupt request line and ground. The Interrupt Request lines on a P996 bus are active high. Thus, the usual and useful technique of wire-ORing open-collector-driven bus signals that are active low cannot be used for interrupt-sharing in a PC bus architecture. Because of these restrictions, some of the P996 interrupt circuits will not work well in a PC/104 module, if interrupt sharing is desired. One suitable circuit for interrupt sharing, as well as additional information on the PC/104 standard is set forth in the Draft D1.00, op cit.

The SATPS signals are often presented in a serial format, whereas the PC/104/SATPS CPU 17 only receives and processes signals in a particular parallel format. Further, the PC/104/SATPS CPU 17 may operate at a high processing rate ($\geq 25$ MHz) and may have difficulty operating with the time delays or latency periods that are often necessary for SATPS signal processing. The buffer module 23 and translator module 25 provide for offline time delays and for format translation between an SATPS platform and whatever PC platform is used in the PC/104/SATPS CPU 17. Optionally, the receiver/processor 17 can gain access to the buffer module 23 and/or to the translator module 25 directly and call out particular information needed by the CPU to perform CPU tasks.

Optionally, the receiver/processor 17 also includes an information transfer module 29 that transfers SATPS signal information, or the results of processing such signals in the receiver/processor, to another electronic device (not necessarily a part of the PC/104/SATPS Card itself) for further processing or display.

An SATPS receiver/processor or CPU 17 usually does not include a very precise clock so that the spatial location coordinates and clock offset coordinate for the signal observation time of the SATPS antenna 13 are determined together, using SATPS signals received from four (or more) SATPS satellites. The three spatial location coordinates and the time coordinate are thus usually linked together and can be referred to collectively as "Location Coordinates", including spatial and temporal coordinates. If fewer than three spatial location coordinates are needed, the number of SATPS signals received can be reduced accordingly.

Optionally, the PC/104/SATPS Card also includes data/instruction entry means 31, such as a keyboard or pen-and-tablet. Optionally, the PC/104/SATPS Card includes a location/time display module 33 that displays in a visually perceptible manner one or more Location Coordinates for the antenna 13 determined by the receiver/processor or CPU 17 from the SATPS signals received. Optionally, the PC/104/SATPS Card includes one or more expansion modules to perform other tasks. Optionally, the PC/104/SATPS Card 11 also includes a firmware or software module 35 that resets a CPU system clock to the appropriate UTC time.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1 = 1575.42$ MHz and an L2 signal having a frequency $f2 = 1227.6$ MHz. These two frequencies are integral multiples $f1 = 1540 f0$ and $f2 = 1200 f0$ of a base frequency $f0 = 1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the C/A-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10f0 =10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0 =1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York 1992.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602 +9 k/16) GHz and f2=(1.246+7 k/16) GHz, where k (=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

I claim:

1. Apparatus for determining the present value of at least one Location Coordinate of an observer located in the vicinity of the Earth's surface, the apparatus comprising:

a PC/104/SATPS Card, that receives and processes Satellite Positioning System (SATPS) signals from one or more SATPS satellites, where the PC/104/SATPS Card is built according to the following standards:

the PC/104/SATPS Card provides at least one of 8-bit signal processing and 16-bit signal processing, and the Card complies with the I.E.E.E. P996 Standard for a personal computer bus and a card that includes this bus and a personal computer, with the following changes in the I.E.E.E. P996 Standard;

the physical size of the PC/104/SATPS Card is about 9 cm by 9.5 cm by 1.5 cm;

the PC/104/SATPS Card has a first bus connection group having about 64 electrical connection pins and a second bus connection group having about 40 electrical connection pins;

the PC/104/SATPS Card includes at least two signal processing modules that are self-stacking when assembled together, and each module consumes at most about 2 Watts of power; and four electrical signals generated on the PC/104/SATPS Card each require a maximum of about 20 milliamps of drive current, and all other signals generated on the Card require drive currents of at most about 6 milliamps;

an SATPS antenna positioned on the PC/104/SATPS Card to receive SATPS signals from one or more SATPS satellites, with each signal being characteristic of a particular satellite, and to issue these signals as antenna output signals;

a radiofrequency downconverter positioned on the PC/104/SATPS Card to receive the antenna output signals, to convert the primary frequency of each of these signals to a selected lower frequency, and to issue these down-converted signals as downconverter output signals;

a programmed digital signal processor and associated memory positioned on the PC/104/SATPS Card to receive the downconverter output signals corresponding to each SATPS signal received by the antenna, to determine the present value of at least one Location Coordinate for the antenna, and to issue this Location Coordinate present value as a processor output signal; and an information transfer module positioned on the PC/104/SATPS Card to receive the digital signal processor output signal and to transmit this output signal to an electronic device that is linked to the PC/104/SATPS Card, for further signal processing of the present value of at least one Location Coordinate for the antenna.

2. The apparatus of claim 1, further comprising signal format translator means on said PC/104/SATPS Card, connected to said digital signal processor, for receiving said SATPS signals and converting said signals from an SATPS format into a format that can be accepted and processed by said digital signal processor.

3. Apparatus for determining the present value of at least one Location Coordinate of an observer located in the vicinity of the Earth's surface, the apparatus comprising:

a PC/104/SATPS Card, that receives and processes Satellite Positioning System (SATPS) signals from one or more SATPS satellites, where the PC/104/SATPS Card is built according to the following standards:

the Card provides at least one of 8-bit signal processing and 16-bit signal processing, and the Card complies with the I.E.E.E. P996 Standard for a personal computer bus and a card that includes this bus and a personal computer, with the following changes in the I.E.E.E. P996 Standard:

the physical size of the PC/104/SATPS Card is about 9 cm by 9.5 cm by 1.5 cm;

the PC/104/SATPS Card has a first bus connection group having about 64 electrical connection pins and a second bus connection group having about 40 electrical connection pins;

the PC/104/SATPS Card includes at least two signal processing modules that are self-stacking when assembled together, and each module consumes at most about 2 Watts of power; and four electrical signals generated on the PC/104/SATPS Card each require a maximum of about 20 milliamps of drive current, and all other signals generated on the Card require drive currents of at most about 6 milliamps;

an SATPS antenna positioned on the PC/104/SATPS Card to receive SATPS signals from one or more SATPS satellites, with each signal being characteristic of a particular satellite, and to issue these signals as antenna output signals;

a radiofrequency downconverter positioned on the PC/104/SATPS Card to receive the antenna output signals, to convert the primary frequency of each of these signals to a selected lower frequency, and to issue these down-converted signals as downconverter output signals;

a programmed digital signal processor and associated memory positioned on the PC/104/SATPS Card to receive the downconverter output signals corresponding to each SATPS signal received by the antenna, to determine the present value of at least one Location Coordinate of the antenna, and to issues this Location Coordinate present value as a processor output signal; and an image display module positioned on the PC/104/SATPS Card to receive the digital signal processor output signal and to display the present value of a Location Coordinate of the antenna in a visually perceptible manner.

4. The apparatus of claim 3, further comprising signal format translator means, connected to said digital signal processor, for receiving said SATPS signals and converting said signals from an SATPS format into a format that can be accepted and processed by said digital signal processor.

* * * * *